(12) United States Patent (10) Patent No.: US 7,954,993 B2
Hewinson et al. (45) Date of Patent: Jun. 7, 2011

(54) MEASURING APPARATUS COMPRISING A PELTIER-SEEBECK DETECTOR

(75) Inventors: John Hewinson, Poole (GB); Stuart Ward, Bournemouth (GB)

(73) Assignee: Lasermet Limited, Bournemouth, Dorset (GB)

( * ) Notice: Subject to any disclaimer, the term of this patent is extended or adjusted under 35 U.S.C. 154(b) by 445 days.

(21) Appl. No.: 12/041,399

(22) Filed: Mar. 3, 2008

(65) Prior Publication Data
US 2008/0218748 A1 Sep. 11, 2008

(30) Foreign Application Priority Data

Mar. 9, 2007 (GB) .................................. 0704550.3

(51) Int. Cl.
*G01K 17/00* (2006.01)
(52) U.S. Cl. .............................. 374/32; 374/29; 136/203
(58) Field of Classification Search .................... 374/32, 374/29; 136/203
See application file for complete search history.

(56) References Cited

U.S. PATENT DOCUMENTS

| 3,391,279 | A |   | 7/1968 | Detrio |  |
|---|---|---|---|---|---|
| 5,296,706 | A |   | 3/1994 | Braig et al. |  |
| 5,678,924 | A | * | 10/1997 | Naquin et al. | ................. 374/32 |
| 5,758,969 | A | * | 6/1998 | Freyaldenhoven | ............. 374/32 |
| 6,025,587 | A | * | 2/2000 | Stucchi et al. | ............. 250/208.2 |
| 2003/0012252 | A1 | * | 1/2003 | Bender | ........................... 374/32 |
| 2005/0180487 | A1 | * | 8/2005 | Greenfield et al. | ............. 374/32 |
| 2008/0151492 | A1 | * | 6/2008 | Maddox | ........................ 361/687 |

FOREIGN PATENT DOCUMENTS

DE 103 39952 A1 7/2005

OTHER PUBLICATIONS

International Search Report by the UK Intellectual Property Office, date of search Apr. 17, 2008, for corresponding Application GB 0704550.3.
English-language abstract for DE 103 39952 A1.
European Search Report dated Dec. 21, 2010, issued in corresponding EP Patent Application No. 08250712.0.

* cited by examiner

*Primary Examiner* — Lisa M Caputo
*Assistant Examiner* — Mirellys Jagan
(74) *Attorney, Agent, or Firm* — Klarquist Sparkman, LLP

(57) ABSTRACT

A measuring apparatus comprises a detector device for detecting a variable to be measured, and a controller operative to control the detector device and generate an output signal indicative of the magnitude of the variable being measured. The detector device comprises a housing on which are mounted two Peltier-Seebeck detectors, the detectors being arranged on the housing such that only the first Peltier-Seebeck detector is exposed, in use, to the variable to be measured. The controller is operative to generate the output signal based on the output of the first Peltier-Seebeck detector and the output of the second Peltier-Seebeck detector so as to account for the effect of the ambient heat on each Peltier-Seebeck detector.

15 Claims, 1 Drawing Sheet

MEASURING APPARATUS COMPRISING A PELTIER-SEEBECK DETECTOR

BACKGROUND OF THE INVENTION

The present invention relates to a measuring apparatus comprising a Peltier-Seebeck detector and particularly but not exclusively relates to a light power measuring apparatus.

A Peltier-Seebeck detector is commonly a planar detector with two electrical connections. When electrical voltage is passed through the detector, one side of the detector heats and the other side cools.

Conversely if one side of a Peltier-Seebeck detector is heated compared to the other, the detector is capable of producing an electrical voltage whose magnitude is approximately proportional to the temperature difference between the two sides of the detector.

This latter technique has been proposed in a measuring detector for measuring the power of a light source such as a laser for example. If light energy is applied to an exposed side of the detector, a significant proportion of that energy is absorbed causing the exposed side to be warmed relative to the unexposed side. This generates an output voltage which is proportional to the temperature difference between the two sides of the detector.

However, the temperature difference produced by relatively low power light sources can be relatively small, and the apparatus is therefore sensitive to ambient temperature changes in the environment in which the apparatus is used. This produces an output error voltage related to the change in ambient temperature across the two sides of the Peltier-Seebeck detector. This makes it difficult to achieve a stable, zero, initial detector state from which an accurate measurement of light power can be made.

SUMMARY OF THE INVENTION

According to one aspect of the invention there is provided a measuring apparatus comprising a detector device for detecting a variable to be measured, and a controller operative to control the detector device and generate an output signal indicative of the magnitude of the variable being measured, the detector device comprising a housing on which are mounted two Peltier-Seebeck detectors, the detectors being arranged on the housing such that only the first Peltier-Seebeck detector is exposed, in use, to the variable to be measured, the controller being operative to generate the output signal based on the output of the first Peltier-Seebeck detector and the output of the second Peltier-Seebeck detector.

Preferably both Peltier-Seebeck detectors are mounted on the housing so as to both be exposed, in use, to the ambient heat of the environment in which the measuring apparatus is used, the output signal being generated so as to account for the effect of the ambient heat on each Peltier-Seebeck detector.

Preferably the two Peltier-Seebeck detectors are electrically connected in series.

Preferably one of the Peltier-Seebeck detectors is electrically connected in reverse polarity to the other Peltier-Seebeck detector.

Preferably the two Peltier-Seebeck detectors are thermally connected to a common thermally conductive body.

Preferably the thermally conductive body is mounted on the detector housing by a thermally insulating mount which resists, in use, the thermal conduction between the thermally conductive body and the detector housing.

Preferably the thermally insulating mount comprises a web of material.

Preferably the web of material is of lesser thickness than the thermally conductive body.

Preferably the web of material is arranged as a bulk head so as to split the housing into two cavities, each Peltier-Seebeck detector being contained within a respective cavity.

Preferably the first cavity comprises an aperture that is exposed, in use, to the variable to be measured, one side of the first Peltier-Seebeck detector being exposed to the aperture.

Preferably the measuring apparatus further comprises a sub housing which houses the controller.

Preferably the sub housing is connected to the housing.

The sub housing may be connected to the housing such that there is an air gap between the housing and the sub housing.

The sub housing may be formed with vents to allow air flow into and out of the sub housing.

Preferably the measuring apparatus comprises a light power measuring apparatus.

According to another aspect of the invention there is provided a detector device for use with a measuring apparatus operative to detect a variable to be measured, the detector device comprising a housing on which are mounted two Peltier-Seebeck detectors each of which is operative to generate an output signal indicative of the magnitude of the variable being measured, the detectors being arranged on the housing such that, in use, only the first Peltier-Seebeck detector is exposed in use to the variable to be measured.

According to a further aspect of the invention there is provided a measuring apparatus comprising detector means for detecting a variable to be measured, and control means operative to control the detector means and generate an output signal indicative of the magnitude of the variable being measured, the detector means comprising a housing on which are mounted two Peltier-Seebeck detectors, the detectors being arranged on the housing such that only the first Peltier-Seebeck detector is exposed, in use, to the variable to be measured, the control means being operative to generate the output signal based on the output of the first Peltier-Seebeck detector and the output of the second Peltier-Seebeck detector.

Other aspects of the present invention may include any combination of the features or limitations referred to herein.

BRIEF DESCRIPTION OF DRAWING

The present invention may be carried into practice in various ways, but embodiments will now be described by way of example only with reference to the accompanying drawing which is a sectional side view of an apparatus in accordance with the present invention.

DETAILED DESCRIPTION

Figure 1:
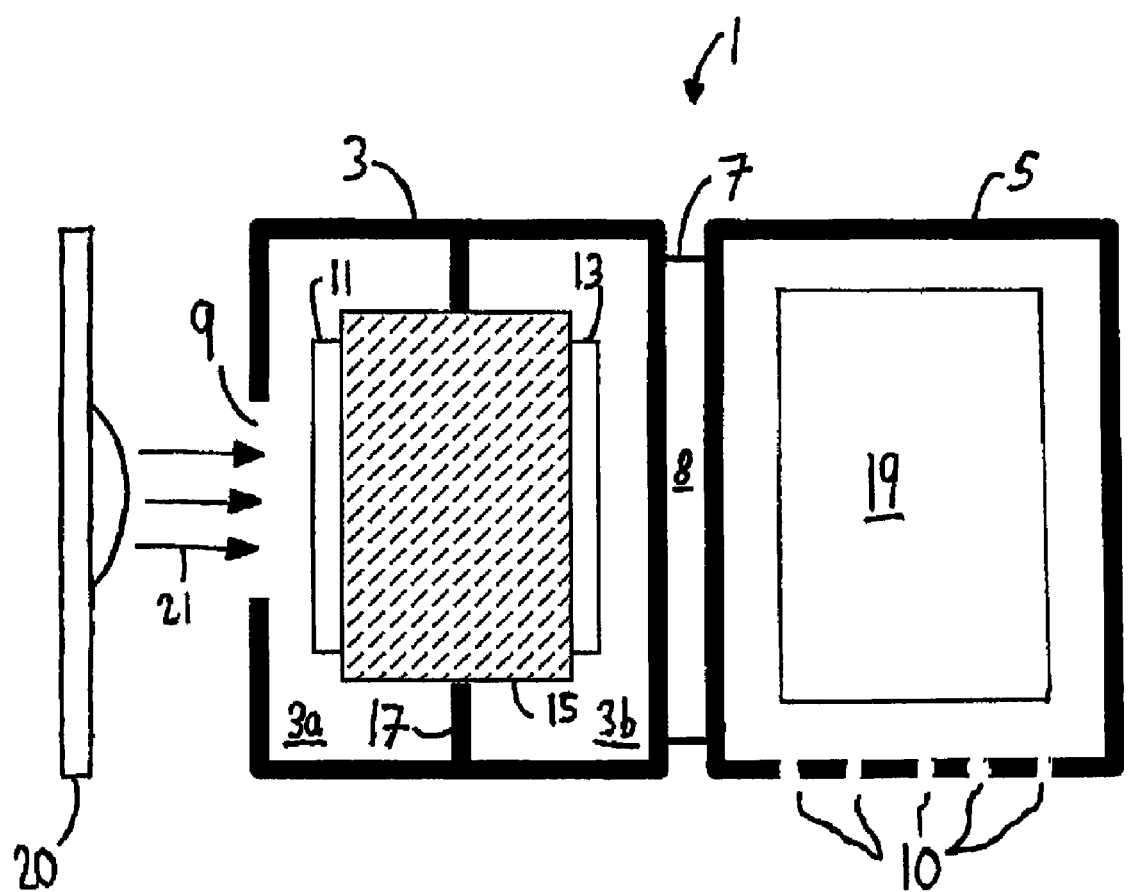

An optical power measuring apparatus 1 comprises a cylindrical main housing 3 connected to a cylindrical sub housing 5 via a connection 7 that spaces the two housings 3, 5 apart such that there is a thermally insulating air gap 8 that resists thermal conduction between the two housings 3, 5. The housing 3 comprises an inlet aperture 9 formed in one face thereof. The sub housing 5 may be provided with vents 10 to facilitate air flow through, and therefore cooling of, the sub housing 5. Any other type of thermal insulation may be used instead of, or in addition to, the air gap 8.

The main housing 3 contains two Peltier-Seebeck detectors 11, 13 that are mounted on opposed faces of a common thermally conductive body comprising a block 15.

The block 15 is mounted on the main housing 3 via a thermally insulating mount in the form of a web-like bulk head 17 that divides the main housing 3 into two cavities 3a, 3b each containing a respective Peltier-Seebeck detector 11, 13. One of the cavities 3a is formed with the aperture 9 and one side of the first Peltier-Seebeck detector 11 is therefore exposed to the aperture 9. The other side of that first Peltier-Seebeck detector 11 is in contact with the block 15.

The bulkhead 17 and block 15 ensure that the second cavity 3b, and the second Peltier-Seebeck detector 13 mounted therein, is not exposed to the aperture 9.

Electronic control means comprising an electronic controller 19 is mounted in the sub housing 5 and it will be appreciated that thermal energy flow into the main housing 3 from heat generated by the electronic control means 19 is resisted because of the thermally insulating air gap 8 between the housings 3, 5. Heat from the electronic control means 19 is dissipated out of the sub housing 5 through the vents 10.

The electronic control means 19 comprises circuitry that is electrically connected to the first and second Peltier-Seebeck detectors 11, 13. The electronic control means 19 is operative to process the voltage output from each detector 11, 13 to generate an output signal indicative of the power of a light source 20 that may be a laser, for example. In this example the first and second Peltier-Seebeck detectors 11, 13 are electrically connected in series but with the polarity of the second detector 13 being reversed from that of the first detector 11.

In use of the apparatus 1, light waves from the light source 20 whose light power is to be measured flow through the aperture 9 and are incident on the first side of the first Peltier-Seebeck detector 11 as indicated by arrows 21. No light waves are incident on any part of the second Peltier-Seebeck detector 13 because of the blocking function provided by the bulk head 17.

The light waves incident on the first detector 11 impart heat energy to the first side of the first detector 11 and this heat energy flows from the first to the second side of the detector 11 and thus generates a proportional primary output voltage.

The first detector 11 also generates a negative ambient voltage output from heat flow generated from the ambient heat of the environment in which the apparatus 1 is used, and in particular from heat flow derived from temperature changes of the housing 3. These temperature changes are resisted by the thermally insulating air gap between the housings 3, 5 and by the thermally insulating bulk head 17 that mounts the detectors 11, 13 on the main housing 1. Nonetheless heat flow from these temperature changes can have an effect and causes heat energy to flow through the thermally conductive block 15 into the second side of the first Peltier-Seebeck detector 11 and into the first side of the second Peltier-Seebeck detector 13. This serves to reduce the primary voltage output from the first Peltier-Seebeck detector 11. This is because the temperature of the second side of the first Peltier-Seebeck detector 11 increases and so reduces the temperature difference between the two sides of the first Peltier-Seebeck detector 11.

At the same time a positive ambient voltage output is produced from the ambient heat energy flow from the first to second sides of the second Peltier-Seebeck detector 13. Provided that the Peltier-Seebeck detectors 11, 13 are matched in terms of their response to heat flow, then the effectively negative ambient voltage output of the first detector 11 will cancel out the positive ambient voltage output of the second detector 13. The resultant voltage output from both detectors 11, 13 is therefore the primary voltage output generated from the heat flow generated from the light waves incident on the first detector 11.

This resultant primary voltage output is used by the electronic control means 19 to generate an output signal indicative of the power of the light source. This output signal may be displayed on an LED or LCD display that is integral with, or separate to, the apparatus 1.

The electronic control means 19 may include an algorithm operative to separate the voltage outputs from each detector 11, 13 and to calculate the voltage output component from the heat generated from the light source 20 itself.

The detectors 11, 13 may be connected in any desired manner that ensures that only one of the detectors is subject to light waves from the light source.

It will be appreciated that the block 15 is centrally mounted on the bulk head 17 such that heat flow through the bulk head 17 should be substantially equal to each detector 11, 13.

What we claim is:

1. A measuring apparatus comprising a detector device for detecting a variable to be measured, and a controller operative to control the detector device and generate an output signal indicative of the magnitude of the variable being measured, the detector device comprising a housing on which are mounted two Peltier-Seebeck detectors, the detectors being arranged on the housing such that only the first Peltier-Seebeck detector is exposed, in use, to the variable to be measured, the controller being operative to generate the output signal based on the output of the first Peltier-Seebeck detector and the output of the second Peltier-Seebeck detector; wherein the two Peltier-Seebeck detectors are thermally connected to a common thermally conductive body and wherein the thermally conductive body is mounted on the detector housing by a thermally insulating mount which resists, in use, thermal conduction between the thermally conductive body and the detector housing.

2. The measuring apparatus of claim 1 in which both Peltier-Seebeck detectors are mounted on the housing so as to both be exposed, in use, to the ambient heat of the environment in which the measuring apparatus is used, the output signal being generated so as to account for the effect of the ambient heat on each Peltier-Seebeck detector.

3. The measuring apparatus of claim 1 in which the two Peltier-Seebeck detectors are electrically connected in series.

4. The measuring apparatus of claim 1 in which one of the Peltier-Seebeck detectors is electrically connected in reverse polarity to the other Peltier-Seebeck detector.

5. The measuring apparatus of claim 1 in which the measuring apparatus comprises a light power measuring apparatus.

6. The measuring apparatus of claim 1 further comprising a sub housing which houses the controller.

7. The measuring apparatus of claim 6 in which the sub housing is connected to the housing.

8. The measuring apparatus of claim 6 in which the sub housing is connected to the housing such that there is an air gap between the housing and the sub housing.

9. The measuring apparatus of claim 6 in which the sub housing is formed with vents to allow air flow into and out of the sub housing.

10. The measuring apparatus of claim 1 in which the thermally insulating mount comprises a web of material.

11. The measuring apparatus of claim 10 in which the web of material is of lesser thickness than the thermally conductive body.

12. The measuring apparatus of claim 10 in which the web of material is arranged as a bulk head so as to split the housing into two cavities, each Peltier-Seebeck detector being contained within a respective cavity.

13. The measuring apparatus of claim 12 in which the first cavity comprises an aperture that is exposed, in use, to the variable to be measured, one side of the first Peltier-Seebeck detector being exposed to the aperture.

14. A detector device for use with a measuring apparatus operative to detect a variable to be measured, the detector device comprising a housing on which are mounted two Peltier-Seebeck detectors each of which is operative to generate an output signal indicative of the magnitude of the variable being measured, the detectors being arranged on the housing such that, in use, only the first Peltier-Seebeck detector is exposed in use to the variable to be measured, wherein the two Peltier-Seebeck detectors are thermally connected to a common thermally conductive body and wherein the thermally conductive body is mounted on the detector housing by a thermally insulating mount which resists, in use, thermal conduction between the thermally conductive body and the detector housing.

15. A measuring apparatus comprising detector means for detecting a variable to be measured, and control means operative to control the detector means and generate an output signal indicative of the magnitude of the variable being measured, the detector means comprising a housing on which are mounted two Peltier-Seebeck detectors, the detectors being arranged on the housing such that only the first Peltier-Seebeck detector is exposed, in use, to the variable to be measured, the control means being operative to generate the output signal based on the output of the first Peltier-Seebeck detector and the output of the second Peltier-Seebeck detector, wherein the two Peltier-Seebeck detectors are thermally connected to a common thermally conductive body and wherein the thermally conductive body is mounted on the detector housing by a thermally insulating mount which resists, in use, thermal conduction between the thermally conductive body and the detector housing.

\* \* \* \* \*